BEST AVAILABLE COPY

May 18, 1943 A. G. STEINMAYER Re. 22,319

FUSE LINK CONSTRUCTION

Original Filed Nov. 16, 1934

INVENTOR.
ALWIN G. STEINMAYER

BY Chester W. Brown
ATTORNEY.

Reissued May 18, 1943 BEST AVAILABLE COPY Re. 22,319

UNITED STATES PATENT OFFICE 22,319

FUSE LINK CONSTRUCTION

Alwin G. Steinmayer, South Milwaukee, Wis., assignor to Line Material Company, South Milwaukee, Wis., a corporation of Delaware Original No. 2,270,225, dated January 13, 1942, Serial No. 420,295, November 24, 1941, which is a division of Serial No. 753,358, November 16, 1934. Application for reissue March 1, 1943, Serial No. 477,531

31 Claims. (Cl. 200—117)

This invention relates to improvements in tension type fuse links.

The subject matter hereof has been divided from my copending application Serial No. 753,358, filed November 16, 1934, pursuant to Patent Office Rule 106.

It is an object of this invention to provide for expulsion fuses, a fuse link comprising a combination of assembled tensioned elements which are, by reason of the tension, substantially instantaneously separable when the fusible section of the fuse link fuses.

It is a further object to provide a fuse link assembled as aforesaid prior to its insertion in an expulsion fuse tube, whereby the tension of the fuse link may be set at a standard value prior to its incorporation into a fuse tube.

Another object is to provide a factory tensioned fuse link for replacement in an expulsion tube which will be expelled from the tube by the tensioning spring when the fusible section of the fuse link is severed.

A still further object is to provide a factory tensioned fuse link in which the fuse link is provided with means for guiding the spring which tensions the fusible section of the link.

It is also a further object to provide a fuse link having a tensioned fusible section and a rigid section expellable from an expulsion fuse cartridge by means of the tension spring when the fusible section is severed, the rigid section serving as a guide to the spring and maintaining its direction of movement from the cartridge substantially unchanged and thereby compelling the flexible portion of the link to move from the cartridge.

It is still another object to provide an elongated rigid section which may be actuated, when the fusible section of the link is severed, to a velocity greater than would be possible with the flexible section alone.

It is also another object to provide a flexible fuse link with a portion adjacent the fusible section and which is less fusible than the flexible portion of the link, thereby keeping the metallic gases generated by the arc at a minimum and consequently shortening the time during which the arc will continue.

It also is an object to provide an assembled tensioned fuse link in combination with an arc suppressing material which will destroy or interrupt an arc created after the fusible sections of the link have been separated.

In the drawings.

Throughout the several views, like parts are referred to by the same reference characters.

Figure 1:
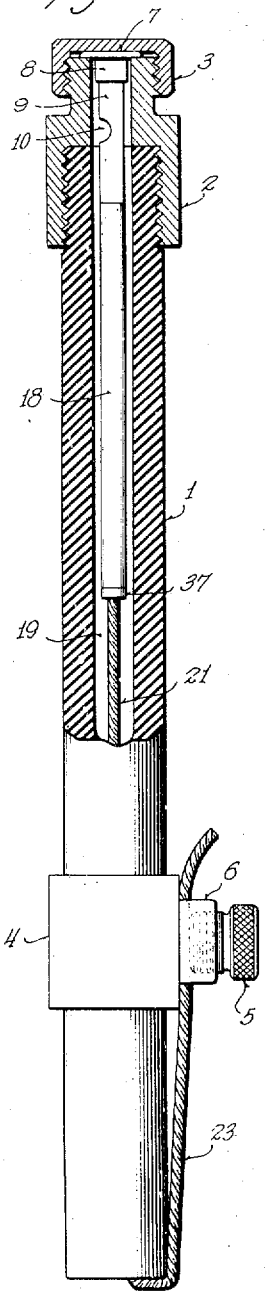
Figure 1 is a view in side elevation of a fuse tube with a portion broken away to show a fuse link embodying this invention mounted therein.

The expulsion fuse cartridge shown in Figure 1 comprises an electrically non-conductive tube 1, an upper tubular contact terminal 2 to which the tube 1 is threaded, a closure cap 3 threaded to the terminal 2, and a lower contact terminal 4 through which the tube 1 extends and to which it is secured. The lower contact is provided with a link engaging clamping bolt 5 threaded into the boss 6 on the terminal 4. This boss is slotted transversely relative to the bolt 5 to receive the flexible end of the fuse link, as will more particularly be described hereafter.

Figure 2:
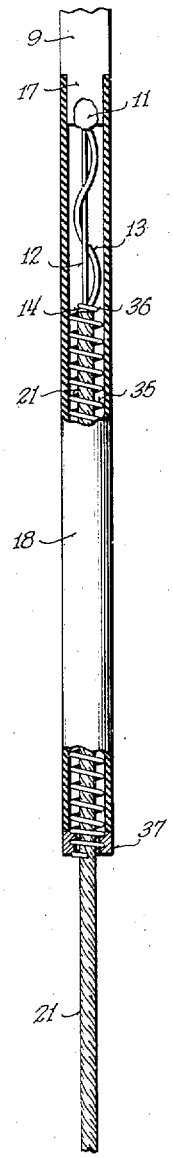
Figure 2 is a view in side elevation of the fuse link shown in Figure 1 and embodying this invention, portions being broken away to show the inner elements.

The fuse link shown in Figures 1 and 2 comprises an upper contact cap 7 seated on the upper terminal 2 and connected by the portion 8 to the strip 9 which is notched at 10 to provide an area that may be easily severed to adapt it for insertion in other types of fuse tubes than that shown. The strip 9 is secured by means of solder 11 to a strain wire 12 having a high melting point and to a fuse wire 13 having a low melting point. Both of these wires 12 and 13 are secured by solder 14 to the flexible wire 21 as shown in Figure 2.

As illustrated in Figure 2, the strip 9 has an area 17 reduced in width to be received in the insulating tube 18 which surrounds the strain wire 12, fusible wire 13 and flexible wire 21. In Figures 1 and 2, a coil spring 35 engages the lower end of the tube 18 by means of a nut washer 37 threaded on the spring and is coaxial with the flexible wire 21. The upper end of the spring 35 is crimped into engagement with the upper end of the flexible wire 21 to exert a pull on the strain wire 12, thus maintaining the strain wire under tension. The flexible wire 21 extends to the lower opening of the tube 1 and is bent back upon the outer side of the tube to position the end 23 in the slotted lug 6 on lower contact terminal 4 to be clamped by means of the clamping bolt 5.

Figure 3:
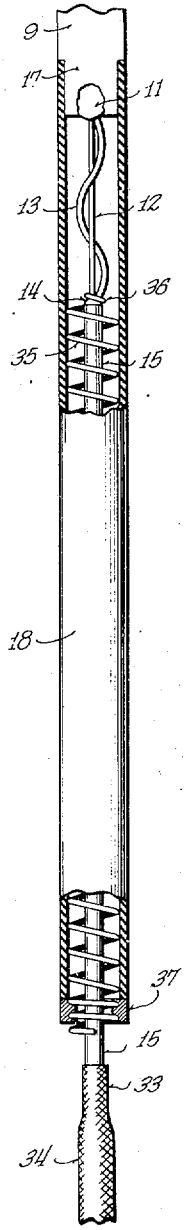
Figure 3 is a view similar to Figure 2 showing a further modified form.

In Figure 3, the rod 15 is secured in any suitable manner (such as soldering) at 33 to the

BEST AVAILABLE COPY flexible wire 34. A tube 18 surrounds the rod 15 and spring 35 which is coaxial with the rod and is engaged with the upper end thereof at 36. Seated on the lower end of the tube is a nut washer 37 threaded on the lower end of the spring and holding the spring under tension. The arrangement of the elements in Figure 3 is the same as that in Figure 2, except that the rod 15 in Figure 3 is substituted for that portion of the flexible wire 21 which extends into the tube 18 in Figure 2.

Figure 4:
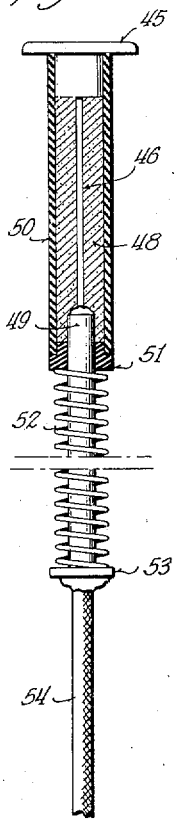
Figure 4 is a view in vertical section showing a tensioned and arc extinguishing fuse link embodying this invention.

Figure 4 illustrates the invention disclosed in Figures 1 to 3 inclusive. The fuse link comprises a contact cap 45, a fusible section 46 secured to the cap and to the rod 49. Surrounding the fusible section is a compound of arc extinguishing material 48 which is enclosed by the insulating tube 50. A cap or plug 51 closes the bottom of the tube and serves as a seat for the spring 52 and is centrally apertured to receive the rod 49. The plug 51 also serves to retain the material 48 in the tube if such material is made in powder form. In this form of the invention, the insulating tube 50, cap 45, and plug 51 will confine the arc extinguishing material. The spring 52 is held under compression between the plug 51 and washer 53 by means of the wire 46 and rod 49 to which the washer 53 is secured by soldering. The rod 49 is likewise secured to the flexible section 54 of the fuse link.

From the foregoing description, it will be observed that each of the embodiments of the invention disclosed herein is provided with guiding means for the fuse tensioning springs. In Figures 3 and 4, the guiding means comprises, respectively, the rod 15 in Figure 3 and the rod 49 in Figure 4. In Figure 4, the spring 52 is under compression, and therefore the rod 49 holds the spring from lateral movement intermediate the ends. In Figure 3, the spring 35 is elongated so that it is pulling on the upper end of the rod 15. In this latter form, the spring naturally will tend to remain coaxial with the spring link. However, when the fuse wire 13 and tension wire 12 are severed, the spring impels the rod 15 toward the lower end of the tube 18. If the rod 15 is not provided, there would be some tendency for the spring to jam within the walls of the tube 18, although this would not be a serious matter in a carefully constructed fuse link such as shown in Figure 3. As a matter of fact, the tube 18 itself will produce to a considerable extent the foregoing noted results produced by the rod 15.

In Figure 2, I have not illustrated guiding means constituting a portion of the fuse link proper. However, I have shown the tension springs disposed in the tubes enclosing the fusible sections of the fuse links. The portion of the tube surrounding the spring acts as the guide for the spring and holds the spring throughout its length substantially coaxial with the fuse link.

When the fuse wire 13 and tension wire 12 are severed, the spring will cause the link to move relatively downward with respect to the tubes and toward the open end of the cartridge 1. The impetus attained through the action of the spring will be manifested in a very high velocity of the severed end of the link toward the open end of the fuse cartridge 1. Even after the spring has spent its energy, the kinetic energy of motion of the fuse link will cause the link to continue its movement until it has been expelled from the fuse cartridge.

Thus it will be seen that a fuse link has been provided in which the tension exerted on the fusible section may be set at a predetermined value prior to its insertion in a fuse cartridge and in which the expulsion action is positive and not dependent upon any possible expelling effect that may arise from the arc. As a matter of fact, the tendency is to extinguish the arc much quicker than it would ordinarily be extinguished in a non-tensioned fuse link.

The operation of the device shown in Figure 4, when expelling the fuse link from a fuse cartridge, is substantially like the action of the device illustrated in Figure 2. However, there is an added feature to the form illustrated in Figure 4 which embodies a material surrounding the fusible section of the fuse link and which contains material from which water vapor or other arc extinguishing gases may be evolved under the influence of an arc to impose in the path of the arc the equivalent of a resistance to the flow of current. I prefer materials such as boric acid which give off water vapor under the influence of the heat of an arc for the reason that it has been found that water vapor is extremely effective in extinguishing an arc. Thus, it will be seen that in the form illustrated in Figure 4, I obtain a separation of the fuse sections in a minimum space of time and also secure the extinguishing of the arc much sooner than it would be extinguished without the evolution of water vapor. While I have stated that I prefer material such as boric acid, it will be understood that I may use other materials which will evolve either water vapor or gases such as hydrogen which will effectively destroy an arc.

It will be noted that in the structure illustrated in Figure 4 the material 48 provides the equivalent of a small bore of substantially the same size as and enclosing the fusible section 46 of the link. The effect produced by this small bore upon an arc is to confine the arc to a limited space and consequently greatly increase the resistance to flow of current through the bore when the fusible section has separated. While I have indicated that I prefer boric acid as an arc extinguisher, it will be obvious from the foregoing that a sleeve of electrically non-conductive material, such as rotten stone, may be used for the sole purpose of restricting the arc path and thereby suppress the arc sooner than the arc would normally be suppressed if the sleeve is not provided. There conceivably are conditions under which a restricted path will serve to suppress an arc just as satisfactorily as water vapor or other fluids. For this reason, I do not restrict all of the claims to the use of boric acid or other volatilizable material. Figure 4 illustrates a novel method of suppressing an arc at the same time that the fused sections of the link are being separated by the spring. Therefore, claims predicated upon the invention disclosed in Figure 4 are intended to cover any equivalent arrangement producing the same results.

When this invention is used without arc suppressing material, I prefer the arrangement shown in Figure 3 or its equivalent. In the links illustrated in Figures 3 and 4, I have provided a rod section 15 and 49, respectively, each provided with an expulsion spring concentric therewith. In the Figure 3 link, the spring 35 is under tension, while in the Figure 4 link, the spring is under compression.

One of the advantages of having a portion of

BEST AVAILABLE COPY the link constructed of a solid rod is in the fact that the possibility of the metal being vaporized by the arc between separated portions of the link is reduced to a minimum. It has been found that the fine strands of a flexible conductor will heat more readily and accordingly vaporize more freely than a single large conductor, such as illustrated in Figures 3 and 4. Therefore, it is desirable to place a single solid conductor in the link between the flexible section and the fusible section. The solid conductor spaces the flexible section of the link from the fusible section and prevents the arc from reaching the more easily fusible strands of the flexible section.

A further function of the rods 15 and 49 is to serve as means to which a high velocity may be positively and quickly imparted and which will tend to maintain a substantially straight line movement after motion has been imparted thereto by their respective springs. In those modifications of fuse links which are not provided with rod or rigid conducting section, the flexible portion of the fuse link tends to interfere with the springs when the latter are relieved of their tension. While I have indicated that the use of a rigid section in the fuse link is desirable, nevertheless, those fuse links which are not provided with rigid sections in the link give satisfactory service, because I have provided a rigid member in the form of an insulating tube which guides the spring and the flexible section of the link and thereby assists the spring in imparting a maximum velocity to the link in the quickest possible time. The rod section of the link gives the added feature of protecting the flexible section against fusion.

I claim:

1. A fuse link comprising a pair of terminals, a fusible section connecting the terminals, a sleeve of insulation surrounding the fusible section and carried on the link, a strain element connected between the terminals and lying within the sleeve and wholly out of contact with the fusible section, and a spring carried by the link, said spring being under stress tending to separate said terminals.

2. A renewable fuse link comprising, a fuse tube, a relatively infusible terminal at one end of said fuse tube, a conductor including a flexible lead extending out of the other end of said fuse tube, a strain wire interconnecting said terminal and said conductor, a fusible element interconnecting said terminal and said conductor, said fusible element being in the form of a wire the length of which between said terminal and said conductor is substantially greater than the distance therebetween, and a spring reacting against said fuse tube and tensioning said strain wire.

3. A fuse link including a fusible section, a relatively rigid section, and a flexible section electrically connected by said rigid section to said fusible section; in combination with a spring concentric with said rigid section and comprising no portion of the circuit through said link, said spring being connected at one end with the fusible section and having its tension exerted between the ends of the fusible section, and an insulating member interposed between the other end of said spring and said link, whereby said spring is held under tension.

4. A fuse link including a fusible section, a relatively rigid section, and a flexible section electrically connected by said rigid section to said fusible section; in combination with a spring concentrically related thereto and comprising no portion of the circuit through said link, a tube surrounding the fusible section, and means engaging one end of said tube with the corresponding end of said fusible section, said spring being held under tension by a portion of the link intermediate the ends of said tube and by the end of said tube remote from said fusible section.

5. A fuse link comprising a terminal portion, a fusible section, a flexible section, an insulating tube surrounding the fusible section, said tube being engaged with the terminal portion, a helical spring concentrically related to said flexible section and including means connecting one end of said spring and the flexible section, the other end of said spring engaging the tube at a point remote from the terminal portion thereby to tension the fusible section, and an arc suppressing material in said tube.

6. A fuse link comprising a terminal portion, a fusible section, a flexible section, an insulating tube surrounding the fusible section, said tube being engaged with the terminal portion, a helical spring concentrically related to said flexible section and including means connecting one end of said spring and the flexible section, the other end of said spring engaging the tube at a point remote from the terminal portion thereby to tension the fusible section, and a deliquescent material in said tube whereby arc suppressing material will be generated when the fusible section is severed.

7. A fuse link having a terminal section, a separable section, a rigid section, and a flexible section, in combination with an insulating tube engaged with the terminal section and surrounding the fusible section and at least a portion of the rigid section, and a spring surrounding the rigid section and having one end engaged with the tube remote from the terminal section and the other end engaged with the rigid section, said flexible section being wholly exterior of said tube.

8. A fuse link having a terminal section, a separable section, a rigid section, and a flexible section, in combination with an insulating tube engaged with the terminal section and surrounding the fusible section and at least a portion of the rigid section, a spring surrounding the rigid section and having one end engaged with the tube remote from the terminal section and the other end engaged with the rigid section, and an arc suppressing material in the tube.

9. A fuse link having a terminal section, a separable section, a rigid section, and a flexible section, in combination with an insulating tube engaged with the terminal section and surrounding the fusible section and at least a portion of the rigid section, a spring surrounding the rigid section and having one end engaged with the tube remote from the terminal section and the other end engaged with the rigid section, and an arc extinguishing material in the tube, said arc extinguishing material embodying water of crystallization.

10. A fuse link including a terminal section, a fusible section, a flexible section, and tensioning means for the fusible section: said means comprising a spring connected at one end with the flexible section, a tube interposed between the other end of the spring and the terminal section whereby to hold said spring under stress and surrounding the fusible section and at least a

BEST AVAILABLE COP portion of said spring, and a tube engaging washer threaded on the tube engaging end of the spring and reciprocal relative to said flexible section.

11. A fuse link comprising a terminal, a fusible section connected to the terminal, a rigid section connected to the fusible section, a flexible section electrically connected with the rigid section, a tube surrounding said fusible section and a portion of said rigid section and engaged with said terminal, and a spring concentric with the tube and engaged at one end therewith, the other end of the spring being engaged with said rigid section at a point remote from the tube, thereby tensioning said fusible section.

12. An electrically conducting link including a separable section, a flexible section, and a rigid section connecting the separable section and the flexible section; in combination with a tube surrounding the separable section and a portion of the rigid section, and a spring engaged with the tube at the end remote from the separable section and with the rigid section at a point remote from the tube.

13. A fuse link for expulsion cartridges, said link including a fusible section and a flexible section electrically connected to said fusible section; in combination with a spring concentrically related thereto and comprising no portion of the circuit through said link, a tube surrounding the fusible section, and means engaging one end of said tube with one end of said fusible section, a portion of the link intermediate the ends of said tube being held under tension by said spring and by the end of said tube remote from said fusible section, said flexible section extending from said remote end to provide a terminal adapted to extend to the exterior of a cartridge.

14. A unitary fuse link for insertion into standard expulsion fuse cartridges of varying lengths and bores having upper and lower line terminals and open at its lower end, said link comprising a fusible portion, a flexible terminal portion electrically connected with one end of said fusible portion and of a length permitting said flexible portion to extend out from the open end of said expulsion fuse cartridge for connection with the lower line terminal, a second terminal engaging portion electrically connected with the opposite end of said fusible portion for connection with the upper line terminal, a tubular member surrounding said fusible portion, means retaining said tubular member in place around said fusible portion prior to rupture thereof, said means comprising a coil spring, a bearing surface upon said second terminal engaging portion for contacting one end of said tubular member, and means coacting with the opposite end portion of said tubular member, whereby a predetermined tension force is applied by said spring to said fusible portion to insure a quick wide separation of its parts upon rupture thereof, said tubular member acting as a compression member resisting tension force prior to rupture of said fusible portion.

15. A fuse link assembly comprising an insulating tube, a terminal mounted on one end of said tube, a rod-like terminal in said tube projecting out of the end thereof opposite the first mentioned end, a fusible section wholly within said tube mechanically interconnecting said terminals, a coil spring in said tube loosely surrounding said rod-like terminal and mechanically connected at one end with said rod-like terminal adjacent said fusible section, an anchor nut loosely surrounding said rod-like terminal and threaded on the end of said spring opposite the first mentioned end thereof, said nut engaging said tube and holding said spring in an extended stressed condition, said rod-like terminal being freely movable outwardly through said nut upon rupture of said fusible section, and a flexible cable connected with said rod in longitudinally spaced relation to said spring and nut.

16. A fuse link assembly comprising an insulating tube, a terminal mounted on one end of said tube, a rod-like terminal in said tube projecting out of the end thereof opposite the first mentioned end, a strain resisting fuse wire wholly within said tube mechanically interconnecting said terminals, a coil spring in said tube loosely surrounding said rod-like terminal and connected at one end with said rod-like terminal adjacent said fuse wire, and an anchor nut loosely surrounding said rod-like terminal and threaded on the end of said spring opposite the first mentioned end thereof, said nut engaging said tube and holding said spring in an extended stressed condition, said rod-like terminal being freely movable outwardly through said nut upon rupture of said fuse wire.

17. A fuse link assembly comprising an insulating tube, a terminal mounted on one end of said tube, a rod-like terminal in said tube projecting out of the end thereof opposite the first mentioned end, a strain resisting fuse wire wholly within said tube mechanically interconnecting said terminals, a second fuse wire electrically connecting said terminals and appreciably longer than the first mentioned fuse wire to avoid stresses transmitted to the latter fuse wire, a coil spring in said tube loosely surrounding said rod-like terminal and connected at one end with said rod-like terminal adjacent said fuse wires, and an anchor nut loosely surrounding said rod-like terminal and threaded on the end of said spring opposite the first mentioned end thereof, said nut engaging said tube and holding said spring in an extended stressed condition, said rod-like terminal being freely movable outwardly through said nut upon rupture of said fuse wires.

18. A fuse link assembly comprising an insulating tube, a terminal mounted on one end of said tube, an elongated terminal in said tube projecting out of the end thereof opposite the first mentioned end, a fusible section wholly within said tube mechanically interconnecting said terminals, a coil spring in said tube loosely surrounding said elongated terminal and mechanically connected at one end with said elongated terminal adjacent said fusible section, and an anchor nut loosely surrounding said elongated terminal and threaded on the end of said spring opposite the first mentioned end thereof, said nut engaging said tube and holding said spring in an extended stressed condition, said elongated terminal freely moving outwardly through said nut upon rupture of said fusible section.

19. A fuse link assembly comprising an insulating tube, a terminal mounted on one end of said tube, a flexible cable in said tube extending out of the end thereof opposite the first mentioned end, a strain resisting fuse wire wholly within said tube mechanically connecting said terminal and cable, a coil spring in said tube loosely surrounding said cable and mechanically connected at one end with said cable adjacent said fuse wire, and an anchor nut loosely surrounding said cable and threaded on the end of said spring opposite the first mentioned end

BEST AVAILABLE COPY thereof, said nut engaging said tube and holding said spring is an extended stressed condition, said cable freely moving outwardly through said nut upon rupture of said fuse wire.

20. A fuse link assembly comprising an insulating tube, a terminal mounted on one end of sad tube, a flexible cable in said tube extending out of the end thereof opposite the first mentioned end, a strain resisting fuse wire wholly within said tube mechanically connecting said terminal and cable, a second use wire electrically connecting said terminal and cable and appreciably longer than the first mentioned fuse wire to avoid stresses transmitted to the latter fuse wise, a coil spring in said tube loosely surrounding said cable and mechanically connected at one end with said cable adjacent said fuse wires, and an anchor nut loosely surrounding said cable and threaded on the end of said spring opposite the first mentioned end thereof, said nut engaging said tube and holding said spring in extended stressed condition, said cable freely moving outwardly through said nut upon rupture of said fuse wire.

21. A fuse link assembly comprising an insulating tube, a terminal mounted on one end of said tube, an elongated terminal extending out of the other end of said tube, a continuous strain wire mechanically interconnecting said terminals, and a coil spring in said tube loosely surrounding said elongated terminal, one end of said spring being connected with said elongated terminal and the other end being connected with said tube to thereby impose a strain on said wire tending to disrupt it.

22. A fuse link assembly comprising an insulating tube, a terminal mounted on one end of said tube, an elongated terminal extending out of the other end of said tube, a continuous strain wire mechanically interconnecting said terminals, a fuse wire electrically connecting said terminals and appreciably longer than said strain wire to avoid stresses transmitted to the latter wire, a coil spring in said tube loosely surrounding said elongated terminal, one end of said spring being connected with said elongated terminal and the other end being connected with said tube to thereby impose a strain on said strain wire tending to disrupt it.

23. A renewable fuse link comprising a fuse tube, a first fuse terminal at one end of said fuse tube, a conductor including a second fuse terminal and a flexible lead extending out of the other end of said fuse tube, fusible means interconnecting said fuse terminals, and a spring carried by the link and tensioning said fusible means, said flexible lead extending out of the lower end of the tube through an abutment bearing against the lower end of the tube and which normally maintains the spring in a stressed condition whereby said fusible means is placed under tension, said abutment being carried by the flexible lead away from the tube upon blowing of the fuse.

24. As an article of manufacture, a self-contained fuse link comprising a fusible element, a first terminal for said element comprising a relatively rigid member, a tube of insulation enclosing said element and resting endwise against said first terminal, anchor means for the remote end of said tube, a flexible lead having an extension passing through said anchor means and forming a second terminal for said element, and a spring connected between said anchor means and said second terminal for placing said element under tension, said anchor means comprising an abutment positioned around said flexible lead and bearing against said remote end of said tube and movable with the lead away from the tube upon blowing of the fuse.

25. The link of claim 7 further characterized by said flexible section extending beyond a projecting lower end of said rigid section and said spring being coiled about said lower end of said rigid section and wholly outside of said tube.

26. The link of claim 12 further characterized by the spring being wholly outside of said tube and being held under compression between said end of the tube and said remote end of said rigid section.

27. The link of claim 12 further characterized by the flexible section comprising a leader projecting beyond said remote and lower end of said rigid section.

28. The link of claim 13 further characterized by the flexible section having a rigid section about which the spring is coiled beyond said remote end of said tube.

29. The link of claim 14 further characterized by the means coacting with the opposite end portion of said member comprising a rigid section telescoping the lower end of the tubular member and about which said spring is coiled beyond said lower tube end.

30. The link of claim 14 further characterized by the spring comprising a compression coil spring telescopically associated with the means coacting with the opposite and lower end portion of the tubular member and bearing against said lower end of the tubular member.

31. The fuse link of claim 14 further characterized by said second terminal engaging portion at the upper end of the tubular member having an annular flanged part for retaining coaction with an upper end of the fuse cartridge, and further by said spring being telescoped about said means coacting with the opposite end portion of the tube member.

ALWIN G. STEINMAYER.